United States Patent [19]

Snedkerud

[11] 3,743,954

[45] July 3, 1973

[54] HIGH POWER MODULATOR-DIMODULATOR AMPLIFIER CIRCUIT

[75] Inventor: Ole Snedkerud, Windisch, Switzerland

[73] Assignee: Patelhold Patentverwertungs & Elektro-Holding AG., Glarus, Switzerland

[22] Filed: Apr. 5, 1972

[21] Appl. No.: 241,245

[30] Foreign Application Priority Data

Apr. 14, 1971 Switzerland ........................ 5383/71

[52] U.S. Cl. ........................ 330/10, 330/24, 307/101
[51] Int. Cl. ............................................ H03f 3/38
[58] Field of Search ...................... 330/10; 307/271; 323/101, 119, 108; 325/344, 345, 346

[56] References Cited

UNITED STATES PATENTS

| | | | |
|---|---|---|---|
| 3,231,885 | 1/1966 | Blauvelt et al. | 323/101 X |
| 3,284,634 | 11/1966 | Redwood, Jr. | 250/214 |
| 3,348,151 | 10/1967 | Holmes | 325/185 |

*Primary Examiner*—Nathan Kaufman
*Attorney*—Greene & Durr

[57] ABSTRACT

For use in high power applications, an apparatus for amplifying input signals having a predetermined upper frequency limit and employing a pair of phase modulated auxiliary carrier frequency sources having the same average frequency value being greater than the upper frequency limit of the input signals. The auxiliary carrier frequency sources are controlled by phase control means to have opposing phase displacements which are related to the momentary values of the amplified input signals. The outputs of said auxiliary carrier frequency sources are summed preferably by transformer means, the summation renders a signal of said average frequency and of modulated amplitude. This sum signal is demodulated, e.g., by fullwave rectification, and filtered to produce an amplified input signal being the amplifier output. Thus said carrier frequencies are performing an auxiliary function in amplifying the input signals and substantially do not appear in the amplifier output.

16 Claims, 12 Drawing Figures

HIGH POWER MODULATOR-DIMODULATOR AMPLIFIER CIRCUIT

The present invention relates to amplifiers and more particularly to high power electronic amplification circuitry in which two alternating waveforms having identical average frequency values substantially greater than the upper frequency limit of the input signal are employed for amplifying input signals.

BACKGROUND OF THE INVENTION

The present invention relates to electronic apparatus for amplifying input signals having a predetermined upper frequency limit. Specifically, the invention relates to an amplifier arrangement which is advantageous for use as a modulation amplifier, i.e., an amplifier for signals operative in modulating the amplitude of a transmitted carrier frequency, which must not be confused with the above-mentioned auxiliary carrier frequencies used in amplifying the modulating signal. A lower frequency limit is not fundamental for such amplifier but, to the contrary, a frequency band having a zero frequency lower limit may be amplified by the present apparatus. Thus, the present invention also relates to amplifier arrangements suitable for D.C. voltage amplifications, as well as wide band frequency amplifiers.

BRIEF DESCRIPTION OF THE INVENTION AND OBJECTS

The object of the invention is to provide an amplifier having a high output efficiency over a relatively wide frequency band which includes a lower frequency limit of zero and which is capable of amplification with high efficiency. In accordance with the present invention, the amplifier comprises two phase modulated auxiliary carrier frequency sources having identical average frequency values which are greater than the upper frequency of the input signals to be amplified. Further, the amplifier of the invention comprises phase control means which provides an alternating voltage output of the two auxiliary carrier frequency sources with opposing correlated phase displacements which are coordinated to the amplitude input signal that is to be amplified. The amplification apparatus further incorporates means for summing the output signals of said auxiliary carrier frequency sources, means for demodulating the resultant sum and filter means for passing only those frequencies lying within the frequency range of the input signals.

An exemtremely accurate phase displacement of the auxiliary carrier frequency sources may be obtained through the use of thyristor alternators which make the amplifier highly efficient due to the fact that the thyristors remain non-conductive until the moment of ignition, while the resonant circuit of such alternator carries substantially no energy in the moment of ignition. One typical example of a thyristor alternator which may be employed in the amplification apparatus of the present invention is described in the General Electric SCR Manuel - Fourth Edition, 1967, pg 228, FIG. 11.2.1.

The summing device mentioned hereinabove may preferably be a transformer, the primary winding of which is connected in series with the auxiliary carrier frequency sources which supply alternating signals or voltages of opposed phase displacements to the transformer primary. The transformer of this type is substantially smaller and of less weight than the typical modulator transformer.

In accordance with a preferred embodiment of the invention, the control means comprises a free-running sine wave generator oscillating with the said average frequency of the auxiliary carrier frequency sources, the output of this generator being coupled to a fullwave rectifier. The output of the latter is connected to the first input of a two-input trigger circuit whose first or switching input is connected to the output of the fullwave rectifier rendering a scanning signal, and whose second input determining the trigger threshold is connected to an adjustable D.C. source and an input signal source. The said trigger circuit operates to generate a square wave pulse whose pulse width varies as a function of the time during which the output of the fullwave bridge rectifier exceeds the instantaneous level of the combined value of the D.C. source and input signal source level. The output of the trigger circuit is connected to a differentiating circuit adapted to generate needle or spike pulses which coincide with the leading and trailing edges of the square pulses generated by the trigger circuit. These needle pulses are connected to control inputs of the auxiliary carrier frequency sources to control their phases in accordance with the desired opposing displacements.

If the phase control means which controls the ignition of the thyristors of said alternators being the auxiliary carrier frequency sources, is provided with a sine wave generator as mentioned before and is further provided with means for generating needle or spike impulses at the midpoint of each half wave cycle and the sine wave output is fullwave rectified and combined with the needle pulses for application to the trigger circuit. The apparatus yields the advantage that in cases of over-modulation, never-the-less, ignition of the thyristors in the auxiliary carrier frequency sources alternators is permitted to operate.

According to a preferred embodiment of the invention, the D.C. voltage component developed at the output side of the modulating signal amplifier is fed back as a form of negative feedback coupling to the phase control means making it possible to adjust the D.C. voltage component to the maximum amplitude of the input signals and thereby adjust the amplifier output to the desired operating requirements of a transmitter requiring such D.C. voltage for class B-modulation. There is thus the constant assurance that the once adjusted modulation degree of transmitter following the amplifier will be maintained throughout operation.

BRIEF DESCRIPTION OF THE FIGURES

Other features and advantages of the amplifier apparatus of the present invention will be made apparent upon a consideration of the following description of examples thereof in connection with the drawings in which.

DETAILED DESCRIPTION OF THE FIGURES

Figure 1:
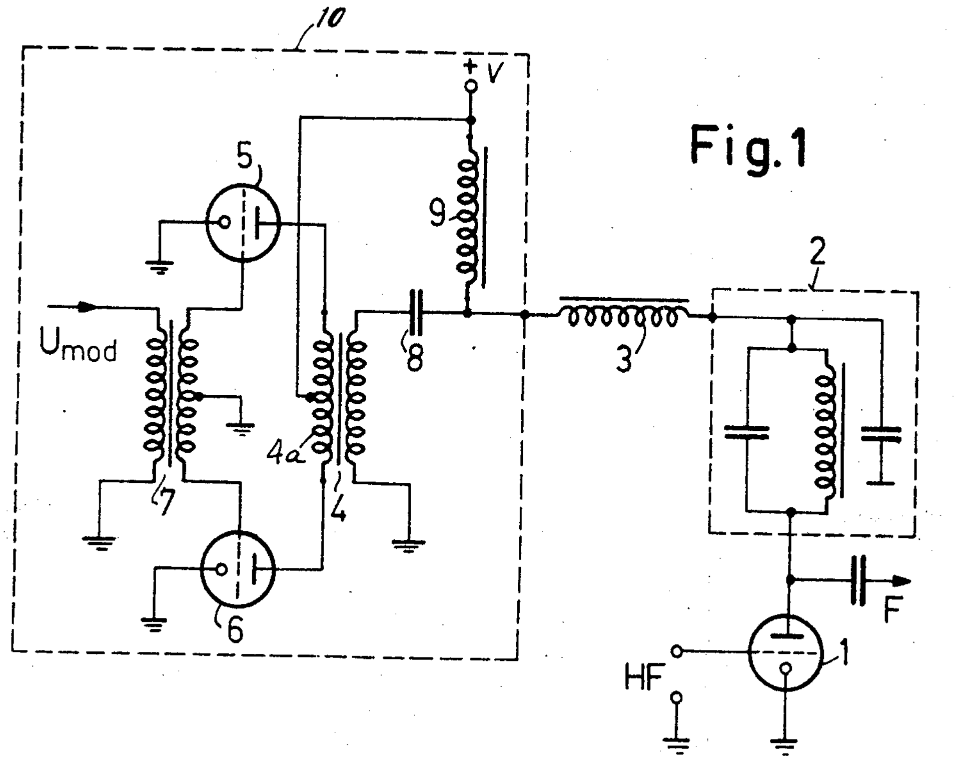
FIG. 1 is a schematic diagram showing a modulation amplifier of the prior art followed by a usual anode-modulation transmitter.

The amplifier arrangement of the present invention has special advantages for use as a modulation amplifier for high power signal transmitters. For an explanation of the preferred application of the invention, there will first be considered the known prior art modulation amplifier such as is shown in FIG. 1. The circuitry of FIG. 1 comprises a signal transmitter with anode-B-modulation. Such circuitry is preferred for high powered transmitters for the use in amplitude modulation because, compared with other modulation circuits such as parallel-tube modulation or premodulation, higher efficiency is achievable. In addition, for anode-modulation of transmitter tubes with the modulating signal, a relatively large control output and a corresponding modulation-power amplifier is required, as is shown in detail in FIG. 1. The transmitter tube 1 has a band-stop filter 2 in the anode circuit which is connected in series with a high frequency choke coil 3. The modulation amplifier 10 consists essentially of two push-pull connected amplifier tubes 5 and 6 whose outputs are impressed upon opposite end terminals of the primary winding 4*a* of a modulation transformer 4. The input signal, i.e., the modulating signal $U_{mod}$ to be amplified, is supplied to the grids of the tubes 5 and 6 via input transformer 7. The anode current of tubes 5 and 6 is supplied by a D.C. source +V connected to the center tap of the primary winding 4*a*. The output signal of modulation amplifier 10, together with a superimposed D.C. component from a D.C. source +V, are impressed upon the anode circuit of transmitter tube 1. The decoupling choke coil 9 prevents A.C. short-circuiting the amplified modulating signal at the secondary of transformer 4. Capacitor 8 suppresses any undesirable D.C. magnetization of transformer 4. The above-mentioned choke coil 3 presents penetration of the high frequency carrier into the output circuit of the modulation amplifier. Band-stop filter 2 provided in the anode circuit of transmitter tube 1 is so designed that the anode of transmitter tube 1, which has a D.C. blocked branch-feed connection F, is able to transmit only signals of the predetermined frequency band, namely the carrier frequency signal amplitude-modulated by the modulating signal and to be transmitted. Furthermore, the maximum amplitude of the amplified modulating signal is so predetermined that the anode potential of tube 1 which is varied via input HF by the carrier frequency signal, additionally is varied within predetermined limits by the amplified modulating signal from the output of the modulation amplifier 10 via band-stop filter 2,for example between zero and maximum amplitude which may for example, be about 30 KV.

With a transmitter output of several megawatts, the output of the modulation transformer 4 should provide an amplified modulating signal of about 15–30 KV and a power output of the above given order of magnitude. In addition, the modulation transformer 4 must be designed for a frequency band of 40 Hz to 10 KHz (corresponding to the low frequency signal range that is to be transmitted). However, since the lowest frequency is of prime significance besides the transmission power, the modulation transformer 4 must be very large and very heavy (of the order of several tons) and also quite expensive making such a device very disadvantageous for use.

Furthermore, it is necessary to apply to tubes 5 and 6 relatively high control power. This requires a correspondingly large amplification, which at the required frequency band and the large voltage and power amplification, operates with unsatisfactory efficiency.

Figure 2:
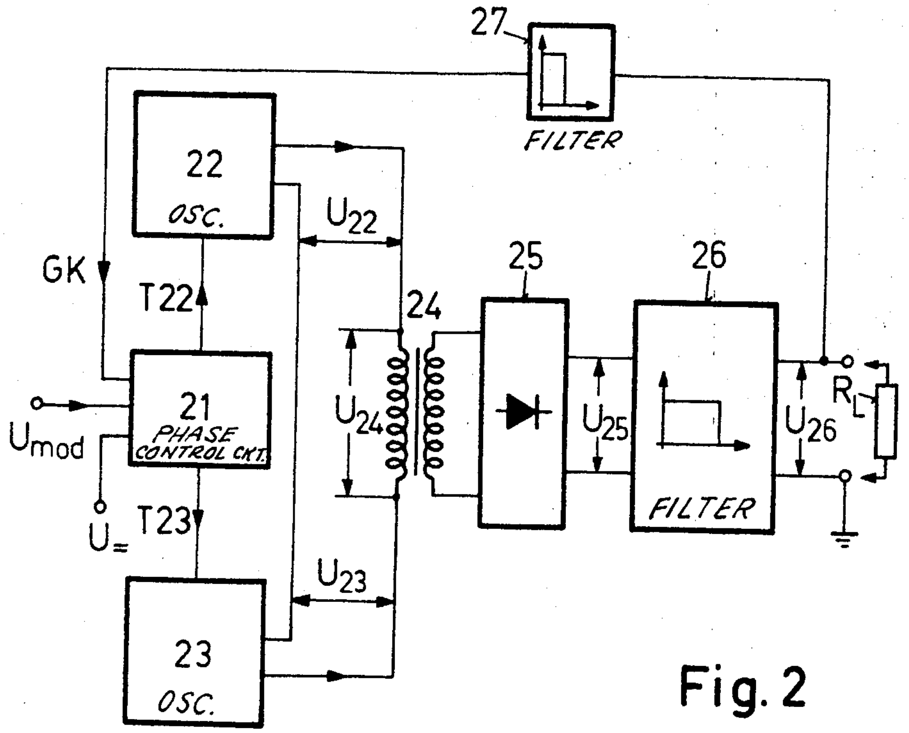
FIG. 2 is a block diagram showing an amplifier apparatus designed in accordance with the principles of the present invention and which is suitable for use as a modulation amplifier in the circuit of FIG. 1.

There will now be explained the substitution of an amplifier of the present invention such as is shown in FIG. 2 for the modulation amplifier 10 used in FIG. 1. In FIG. 2, block 21 is a control circuit forming the said phase control means and cooperating with auxiliary carrier frequency sources 22 and 23, hereinafter designated as sine wave power generators, whose outputs are coupled to transformer 24 connected, in turn, to rectifier 25 being an amplitude demodulation means and followed by a low-pass filter 26. Circuit 27 is also a low-pass filter. $R_L$ is a load resistance, while $U_{22}$, $U_{23}$, $U_{24}$, $U_{25}$ and $U_{26}$ represent the voltage outputs of the circuits 22–26, respectively, as will be explained hereinbelow.

Figure 3:
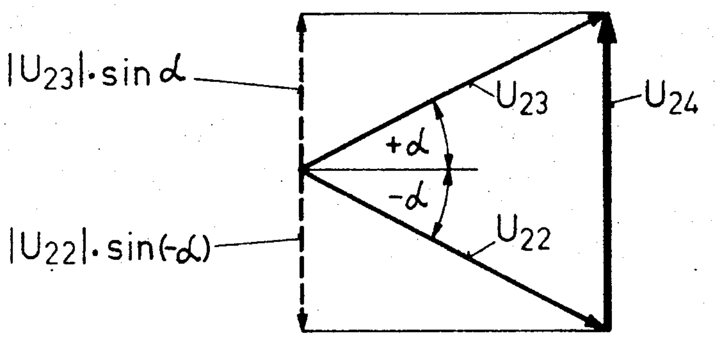
FIG. 3 is a vector diagram useful in explaining the operation of the amplifier of FIG. 1.

In FIG. 3, $\alpha$ designates the phase displacement between the outputs of sine wave power generators 22 and 23.

Figure 4:
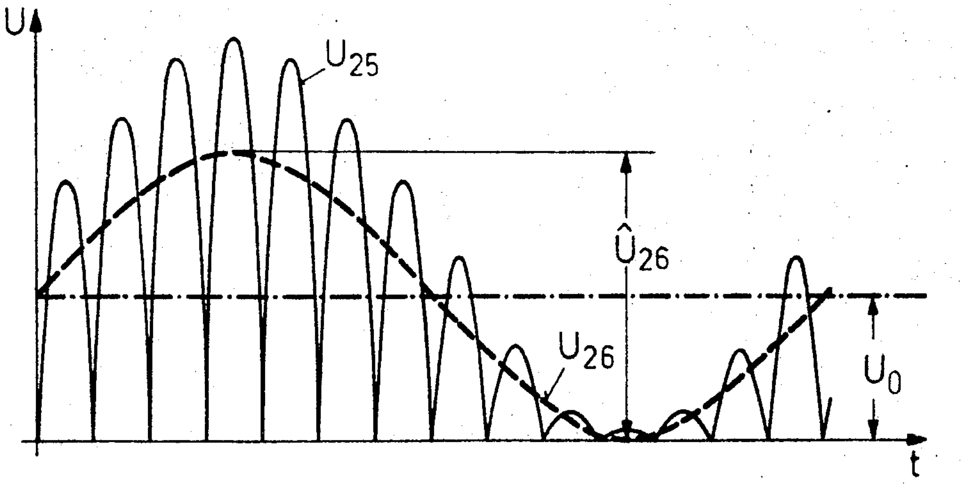
FIG. 4 shows a plot of waveforms in which voltage is plotted against time and is useful in describing the operation of the apparatus of FIG. 2.

FIG. 4 shows the D.C. voltage component $U_0$ and the peak-to-peak amplitude value $\hat{U}_{26}$.

Figure 5:
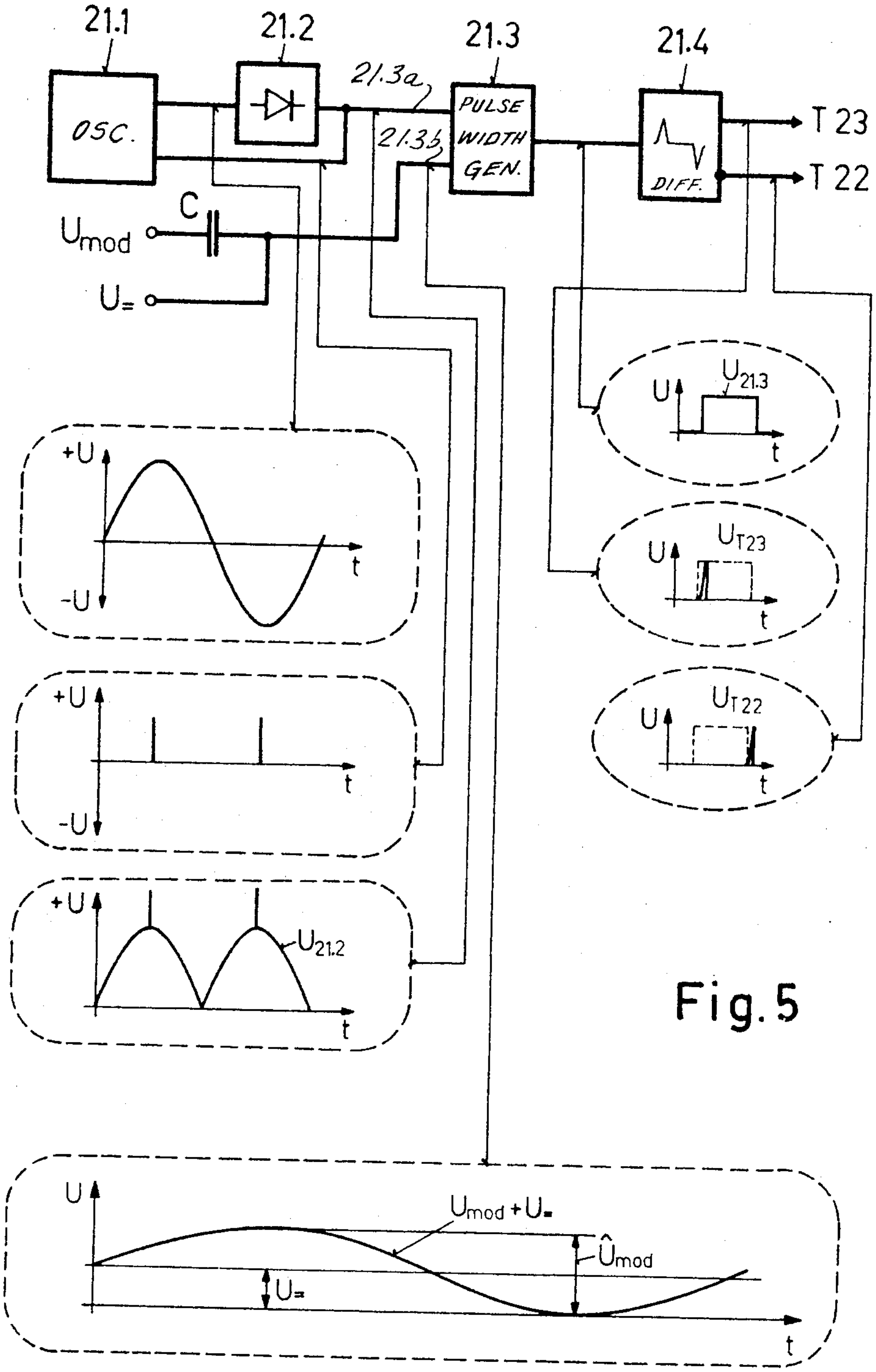
FIG. 5 is a block diagramm showing the phase control means employed in the amplifier of FIG. 2 in greater detail and incorporating waveforms which represent the outputs of the components of the phase control means.

FIG. 5 shows a free-running sine-wave generator 21.1, a full-wave bridge rectifier circuit 21.2, a trigger circuit 21.3 and a differentiator stage 21.4.

Figure 6:
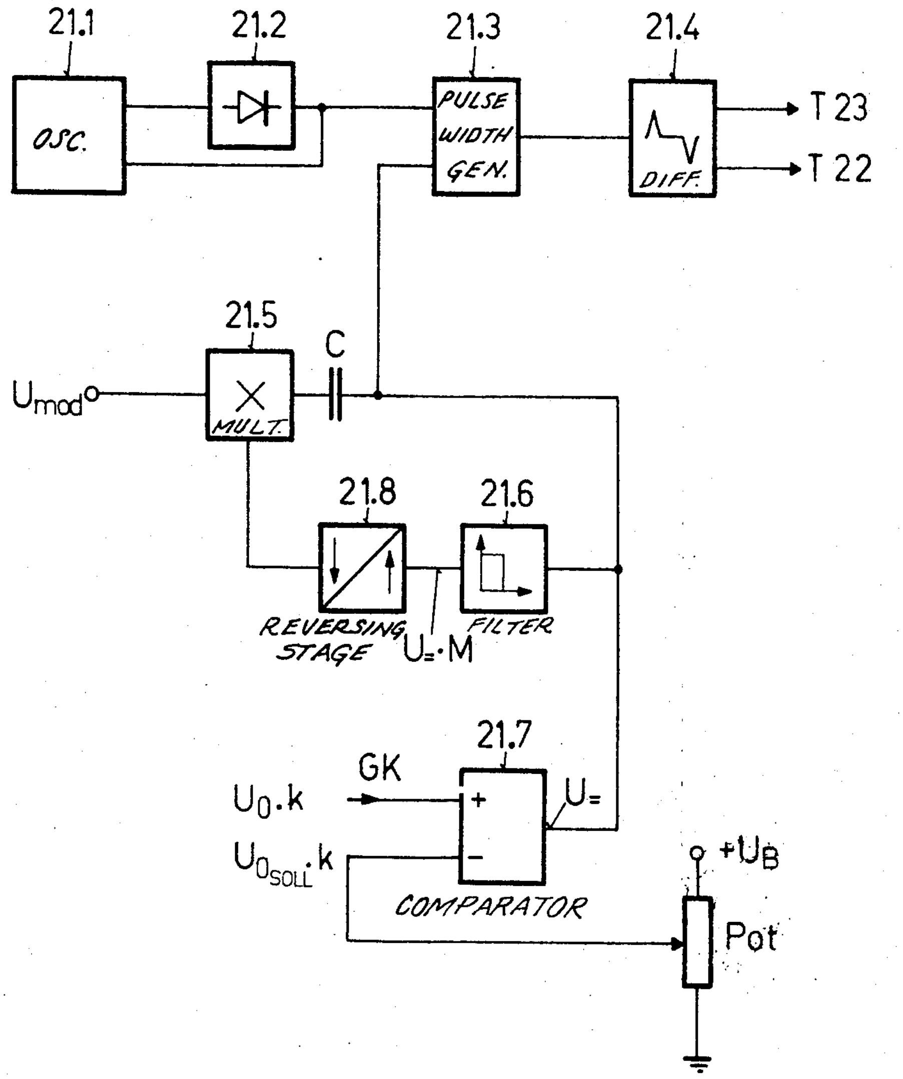
FIG. 6 is a block diagram showing a modified phase control means which may be employed in the apparatus of FIG. 2.

FIG. 6 is a block diagram showing an alternative embodiment for the control circuit of FIG. 5.

In FIG. 7 the same corresponding parts are designated by like numerals.

Figure 8:
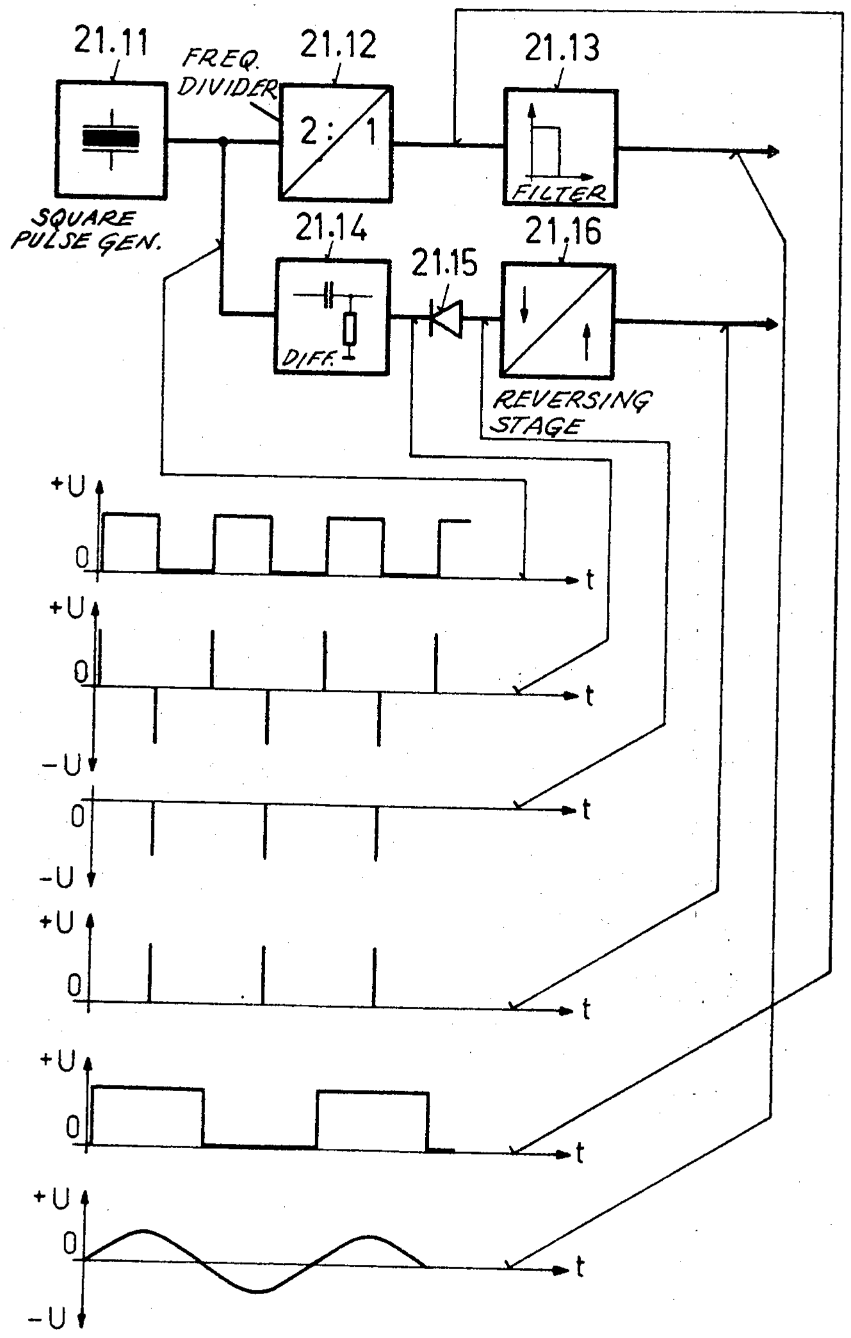
FIG. 8 is a block diagram showing one of the auxiliary carrier frequency sources of FIG. 2 in greater detail and further incorporating waveform diagrams which indicate the signals developed by the components of the auxiliary carrier frequency source.

In FIG. 8, block 21.11 designates a square pulse generator, 21.12 a frequency divider stage, 21.13 a low-pass filter, 21.14 a differentiating member, 21.15 a diode, and 21.16 an inverter.

Figure 9:
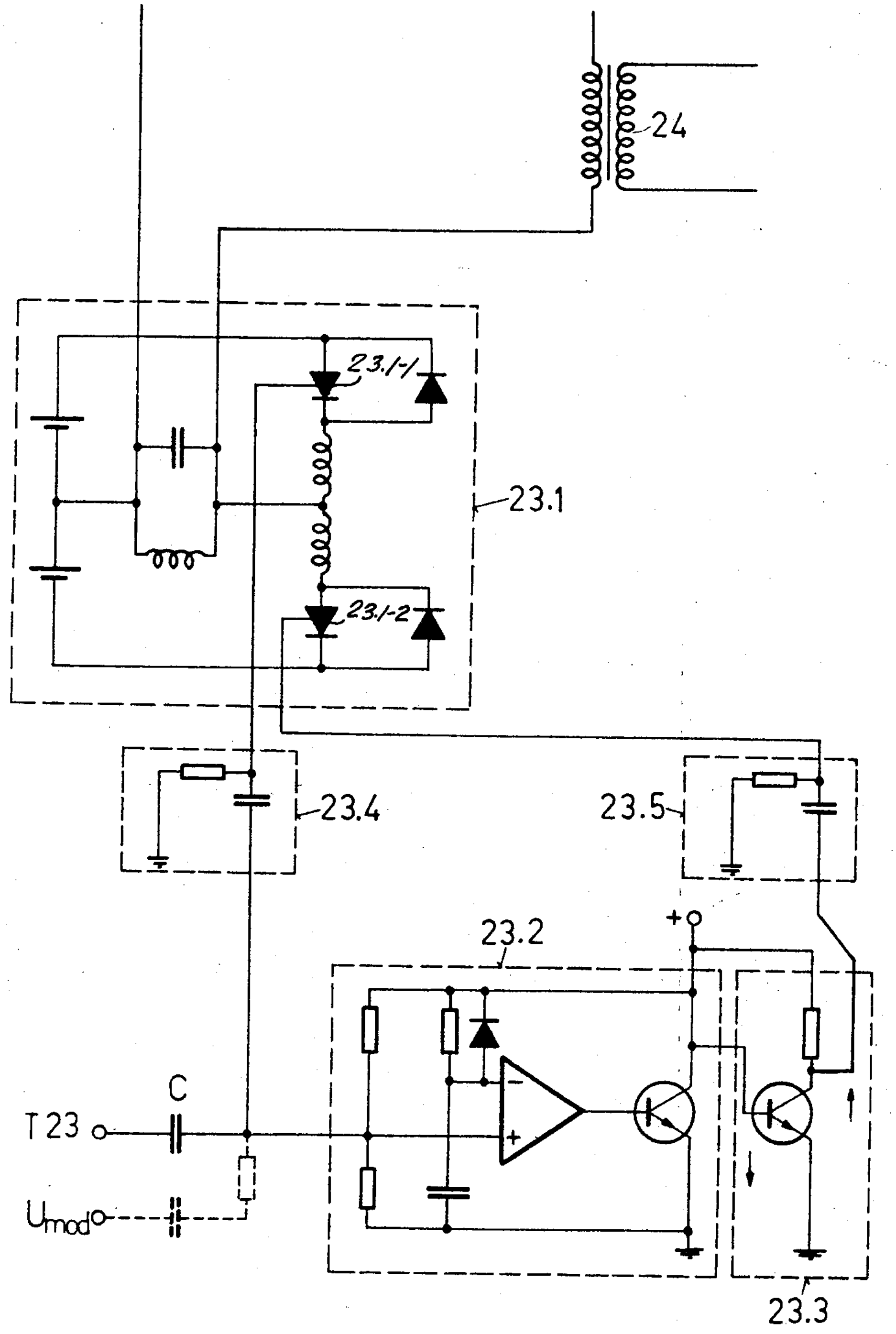
FIG. 9 is a detailed circuit diagram of one of the auxiliary carrier frequency sources shown in FIG. 2.

In FIG. 9, there is designated by reference numeral 23.1 a thyristor alternator. Further, there are a monostable multivibrator 23.2, an inverter 23.3 and differentiating members 23.4 and 23.5.

The operation of the example of the amplifier of the invention will now be explained in connection with FIGS. 2–9.

The block circuit diagram of FIG. 2 includes two sine wave power generators 22 and 23 and a control circuit 21 which will be explained hereinafter in more detail.

The output sides of the sine wave generators 22 and 23 are connected in series by an A.C. path through the primary winding of transformer 24.

Stated more specifically, the sine wave power generators are connected in series so that the sum of their voltages $U_{22}+U_{23}$ is zero when the two sine waves generators operate with the same phase.

However, according to the invention, one of the sine wave power generators (for example, generator 23) is controlled so that its wave is advanced in the above given case by the phase angle $+\alpha$ and sine wave generator 22 has its wave delayed by the phase angle $-\alpha$ (see FIG. 3).

The circuit equations for this circuit may be characterized as follows:

$$\Sigma\ U = 0$$
$$\vec{U}_{24} + (-\vec{U}_{23}) + \vec{U}_{22} = 0$$
$$\vec{U}_{24} = \vec{U}_{23} - \vec{U}_{22}$$
$$|U_{24}| = |U_{23}| \cdot \sin\alpha - |U_{22}| \cdot \sin(-\alpha)$$
$$|U_{24}| = |U_{23}| \cdot \sin\alpha + |U_{22}| \cdot \sin\alpha$$

Since $|U_{23}| = |U_{22}| = |U|$ *we obtain*

$$\underline{|U_{24}|} = |U| \cdot \sin\alpha + |U| \cdot \sin\alpha = \underline{2 \cdot |U| \sin\alpha};$$

For phase angle $\alpha_{max} = 90°$ there is obtained the maximum amplitude $2U$. This correlation is explained by the diagram of FIG. 3.

At the secondary winding of transformer 24 shown in FIG. 2, there will be developed an alternating voltage of the identical average frequency of sine wave generators 22 and 23, the amplitude of which alternating voltage depends upon the relative phase displacement of the two sine wave generator outputs and thus is amplitude-modulated. This phase displacement depends, as will be hereinafter more fully explained, on the modulation signal $U_{mod}$ applied to control circuit 21. The amplitude modulated alternating voltage is demodulated by rectifier circuit 25 and, after passing the low-pass filter 26, develops a filtered and amplified low-frequency modulation signal $U_{26}$. FIG. 4 shows waveform $U_{26}$ in dotted fashion as the output voltage of the modulation signal amplifier, which varies for full modulation from zero to $\hat{U}_{26}$ by the direct voltage component $U_0$, which corresponds to $\hat{U}_{26}/2$.

The D.C. voltage component required for operation of the transmitter tube following the modulation amplifier is thus already supplied by the modulation amplifier, thus avoiding the need for a separate D.C. voltage supply. The heavy and cumbersome low frequency choke coil (element 9 of FIG. 1) may thus be omitted, representing a further important advantage over prior art systems of the type shown in FIG. 1.

Considering, for example, in FIG. 4 the relation of the voltages $U_{25}$ to $U_{26}$, it is seen that the frequency of the sine wave power generator must be at least twice as great as the highest frequency of modulating signal. This requirement is a consequency of the scanning theorem.

In FIG. 2, reference $R_L$ symbolizes the load representing the anode circuit of the transmitter tube 1 of FIG. 1.

In the feedback circuit GK (FIG. 2) there is connected a further low-pass filter 27, the operation of which will be more fully described hereinafter. In the operation of the amplifier of the invention as shown in FIG. 2, a weak input or modulating signal $U_{mod}$ modulates the phase displacement of the two auxiliary carrier frequency sources which may render directly the output power of, for example, several megawatts.

The components of the amplifier of FIG. 2 may incorporate a sine wave power generator designated by the numeral 23 in FIG. 9, which is comprised of the known circuit components shown therein whose operation will be described hereinafter.

The rectifier circuit 25 may be of the full wave bridge type and may be formed with the known type of avalanche diodes.

Low-pass filters 26 and 27 may also be of a known type. The upper frequency limit of the low-pass filter is higher than the highest frequency component of the modulating signal and lower than the identical average frequency of the sine wave signal developed by generators 22 and 23. If the modulation signal is of the speech or tone frequency with a range of 40–10,000 Hz, the upper frequency limit of the low-pass filter may be set, for example, up to 11,000 Hz. The sine wave generator will operate with a frequency of 20–50 KHz or higher. The frequency limit of the low-pass filter 27 should be as low as possible since it need only pass the direct current component $U_0$.

Control circuit 21 is likewise formed in a known way with known components and has been shown in block diagram form in FIG. 2.

In order to follow the development of the control signals $U_{T22}$ and $U_{T23}$, they are shown as voltage versus time diagrams at the corresponding circuit connections shown best in FIG. 5. Therein the free-running sine wave generator 21.1 develops an output voltage of the desired frequency. At an additional output lead, the generator delivers a needle or spike pulse which is timed to occur at the midpoint of each half-cycle of the sine wave.

The sine wave output of the generator 21.1 is coupled to a fullwave bridge 21.2. The spike pulse output of generator is superimposed to the output of bridge 21.2 to develop a scanning signal $U_{21.2}$ which signal is applied to the input **21.3*a* of a trigger circuit 21.3 which comprises a first or switching input 21.3*a* and a second or threshold input 21.3*b*. A reference potential supplied to the second input determines the variable trigger threshold. The voltage of the modulating signal $U_{mod}$ to be amplified is superposed through capacitor C with a D.C. voltage $U_=$. The combined voltage $U_{mod} + U_=$ is applied to the second input 21.3*b* of the trigger circuit 21.3. A circuit suitable for use as the trigger is described in an article published in Sweden in "Radio and Television", No. 12, 1968, page 24, FIG. 17. The second input 21.3b carries the reference potential, namely $U_{mod}+U_=$, and only when the potential at the first input 21.3*a* ($U_{21.2}$) exceeds the reference potential an output signal L appears at the output of the trigger circuit L in FIG. 7*b*,** represents the maximum level output signal of the trigger circuit being contrary to the output signal zero.

Figures 7A, 7B, 7C, 7D:
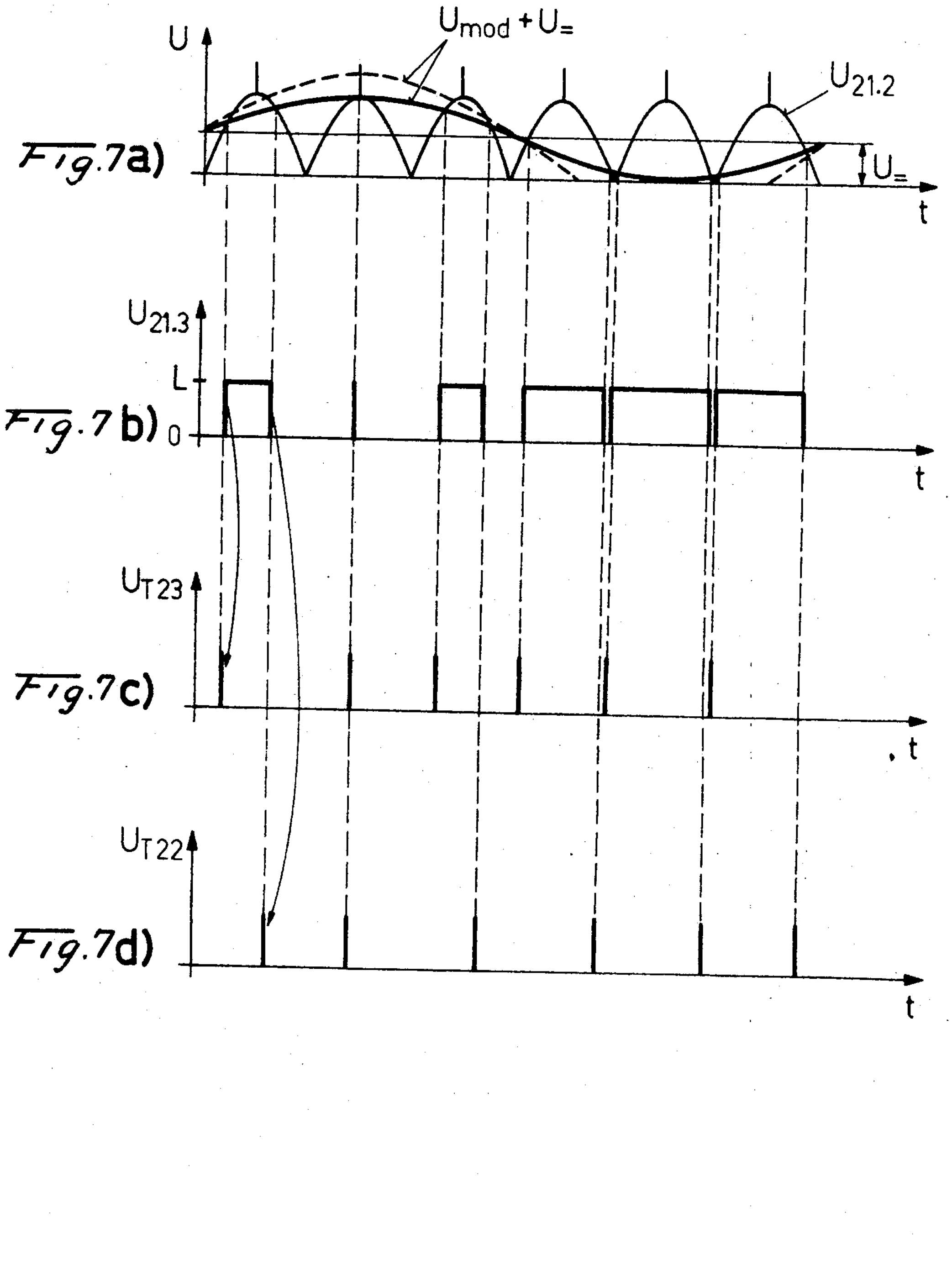
FIGS. 7*a*–7*d* show a plurality of waveforms useful in explaining the operation of the phase control means of FIG. 5.

FIG. **7*a* shows the manner in which the D.C. voltage superimposed upon the modulation signal $U_{mod}+U_=$ is scanned by the signal $U_{21.2}$. Depending upon the momentary voltage value $U_{mod}+U_=$ there will be developed at the output of the trigger circuit 21.3 (FIG. 5) the rectangular pulses of varying width as indicated in FIG. 7*b*.**

The developed rectangular signal pulses shown by waveform 7b are applied to differentiating circuit 21.4 (FIG. 5). The leading edge of the rectangular pulse develops in the differentiating circuit 21.4 a positive needle pulse which is delivered through polarized control circuit T23 which includes a diode element, to the control input of the sine wave power generator 23 (FIGS. 2 and 9). The trailing edge of the rectangular pulse causes the differentiating circuit 21.4 to generate a negative needle pulse which is delivered through an oppositely polarized circuit including a diode element to an inverter circuit (normally a collector-follower transistor stage). From the output of the inverter, the negative pulse is delivered to control lead T22 to the control input of sine wave power generator 22 (FIG. 2). The derivation of the pulses $U_{T22}$ and $U_{T23}$ from the rectangular pulses $U_{21.3}$ shown in the dashline surrounded wave shape diagrams of FIG. 5, and the corresponding signal wave shapes and pulse are shown in FIGS. 7*b* – 7*d* for one full cycle of a modulation signal $U_{mod}$.

It is desirable to operate the transmitter with a predetermined optimum modulation degree. As is well known, the modulation degree may be defined (by reference to FIG. 4) as follows:

$$m = U_{26}/2U_0$$

This equation indicates that when the amplified modulating signal $U_{26}$ varies between zero and the maximum $2U_0$ passing the medium value or D.C. voltes component $U_0$, there is obtained the maximum possible modulation ($m$=1) at which no distortion occurs. A further viewpoint is the transmitter power which is determined by the D.C. voltage component $U_0$ (for example, 30 KV). Accordingly, if the transmitter power is to be varied, it is merely necessary to correspondingly vary the D.C. voltage $U_=$ (FIGS. 2 and 5) since this voltage is inversely correlated to the D.C. voltage component $U_0$.

In relation thereto, it is desirable to adjust the D.C. voltage component $U_0$ by means of a control loop to obtain optimum accurracy. For this purpose a small change is required at the control circuit 21 as shown in FIG. 6.

The desired value of the D.C. voltage component $U_o$ is applied to the negative input of a comperator circuit 21.7, shown in FIG. 6. Preferrably the related operation is not carried on with several thousand volts, and accordingly the voltage must be stepped down by a factor $k$ so as to obtain a value $U_{0Soll}xk$. The D.C. voltage component $U_o$ which is applied to the non-inverted input of the comparator is diminished by the same factor $k$. In order to filter out and attenuate this D.C. voltage component $U_0$, the low-pass filter 27 is connected in the feedback circuit GK (see FIG. 2).

The comparison circuit 21.7 may be made in accordance with the circuit of the above-identified Swedish Publication, page 24, FIG. 16. It is related to an operational amplifier which is connected to operate as a difference amplifier. As is known, such circuit arrangement correlates the voltages applied to its inputs according to the equations $$U_= = (U_0 \times k) - (U_{0Soll} \times k)$$

or $$U_= = (U_0 - U_{0soll}) \cdot k$$

For the purpose of illustration, it is assumed that by means of potentiometer Pot. of FIG. 6 the D.C. voltage component is made smaller and thereby the power is reduced.

The foregoing equation shows that a reduction of $U_{0Soll}$ effects an enlargement of $U_=$. The further part of the operation is best shown in FIG. 7. Let it be assumed that an upward displacement of the line $U_=$ in FIG. 7*a* has occurred represented by the dotted line waveform shown therein. This results in a narrowing of the width of the rectangular pulses developed by trigger circuit 21.3 of FIG. 6 and accordingly shortens the spacing of the control pulses developed therefrom which result, in turn, in a smaller relative phase displacement of the waves of the two sine wave power generators 22 and 23. A decrease in the relative phase displacement results in the reduction of the voltage $U_{24}$ at the input of transformer 24 and, as desired, a reduced D.C. voltage component $U_0$. If $U_{0Soll}\,xk$ is held constant, then as a result of the control circuit, the D.C. voltage $U_0$ will remain constant. To maintain the desired modulation degree despite of the charged value of $U_0$ coupled to a multiplier stage 21.5 (FIG. 6). This stage has an amplification variable in proportion to a D.C. control voltage applied to its control input, this control voltage being determined to the value $1/U_= \times M$ To eliminate interaction from the output of the multiplier stage 21.5 on its control input, a setting member 21.6 is connected in the corresponding control line. Member 21.6 comprises a low-pass filter (similar to that designated by numeral 27 in FIG. 2) in order to assure that only D.C. voltage $U_=$ is effective. In addition the low-pass filter is preferably followed in the circuit by a potentiometer for setting the factor M by which the desired modulation degree $m$ may be adjusted. Because of its simplicity, a detailed representation of the setting member 21.6 has been omitted for the sake of clarity. Obviously, the potentiometer following the low-pass filter may assume the form of the potentiometer Pot. of FIG. 6.

As the multiplication member 21.5, there may be employed, for example, an integrator circuit of the type designated MC1495L manufactured by Motorola. In order to secure the desired regulating effect with the said type of intergrated circuit an inverting circuit 21.8 is provided.

Now the purpose of the spike pulses provided at the midpoint of each sinusoidal half-wave of the output of the freerunning sine wave generator 21.1 (FIGS. 5 and 6) will be explained with reference to FIG. 7. Let it be assumed that an amplification increase in the modulating signal preamplifier (not shown) occurs with the amplitude of the modulating signal rising above the normal value as indicated by the dash waveform $U_{mod}+U_=$ which waveform is shown in dash line fashion in FIG. 7*a*.

Initially a strong distortion of the amplifier modulation signal occurs, but even more importent is the fact that without such spike pulses occurring at the midpoint of each half-cycle there will be no control pulses for the sine wave power generators 22, 23. However, the superimposed spike pulses, one might say, a reserve, which enables the transmitter to continue operation although having distorted modulating signals. In contrast thereto, prior known transmitters must be disconnected when such overmodulation conditions occur.

A suitable sine wave generator also capable of supplying spike pulses may be constructed, for example, in accordance with FIG. 8.

Again referring to the voltage-time diagrams of FIG. 8, the output signal of a square pulse generator 21.11 shown in the circuit diagram of FIG. 8, which may be a quartz-crystal controlled oscillator, is coupled through a differentiating circuit 21.14 to diode 21.15 which couples only negative pulses to an inverter 21.15. Although the spike pulses have the required time-position they are of unsuitable polarity and are, therefore, impressed upon the said invertor 21.16 which operates such that its output develops pulses of suitable polarity. As the inverter there may for example, be provided a collector-follower transistor stage. A fixed phase relation of the spike pulses to the alternating voltage at the output of the sine wave generator is obtained by employing for the production of such alternating voltages a frequency divider 21.12 (note, for example, the German Publication "Funkschau," published 1970, No. 9, page 264 et seq.) which is connected to the output of the square wave generator 21.11. This frequency divider 21.12 develops rectangular square pulses of half the frequency of the square wave pulses developed by generator 21.11. The sine wave is developed from the output of frequency divider 21.12 through a low-pass filter 21.13. Thus, the outputs of low-pass filter 21.13 and of inverter 21.16 are capable of serving as the two outputs of generator 21.1 in FIG. 5 and 6 by supplying the desired waveform which consist of a full-wave rectified sinusoidal signal and spike pulses to superimposed thereon (see waveform $U_{21.2}$ of FIG. 5).

FIG. 9 shows the overall circuit arrangement of sine wave power generator 23 which comprises a thyristor alternator 23.1 and an ignition circuit for the thyristors. The thyristors are shown as 21.1-1 and 23.1-2 in FIG. 9. The circuit blocks 23.1 – 23.5 of FIG. 9 show well-known circuitry employed for thyristor ignition. A detailed description thereof will be omitted for purpose of simplicity.

The circuit components 23.4 and 23.5 are conventional differentiating circuits which pass only short voltage pulses but block undesired superimposed low-frequency signals. The differentiator circuits thus assure that the thyristors of the alternator 23.1 receive clean and sharp ignition pulses. A monostable multivibrator 23.2 returns from its set condition to rest condition after an inherent reset time. In the present case the reset time corresponds to the half-period duration of the output of the alternating voltage of the sine wave power generators. The inverter 23.3 assures that the signal of the monostable multivibrator 23.2 is subjected to a 180° phase displacement.

The control pulse applied to control input T23 is coupled through differentiating circuit 23.4 to the control electrode of thyristor 23.1-1. The input signal T23 also sets the monostable multivibrator 23.2 into its astable condition. After the reset time being equal to a one-half cycle period the monostable multivibrator returns to its rest position and the leading edge of the inverted signal at the output of inverter 23.3 is coupled with the proper polarity through differentiating circuit 23.5 to the control electrode of the second thyristor 23.1-2 which conducts during the second half-wave period.

The thyristor alternator 23.1 generates a sine wave voltage of a constant period duration with the beginning of each period being more or less delayed.

Extended investigations have proven that the phase-control of the sine wave power generators may be made more effective by varying the period-duration, too of the sine wave oscillations. That means, when, for instance, the sine wave power generator 23 operates with a phase delay $\alpha = 0°$ and is next controlled to operate with a phase delay of $\alpha = 90°$ (to achieve this, the momentary frequency must be increased for a short time), this operation is assisted by shortening the period-duration (which likewise effects a frequency increase). By an opposite phase displacement from $\alpha = 90°$ to $\alpha = 0°$, the corresponding period-duration is increased.

This effect may be achieved in a simple way by connecting the signal $U_{mod}$ (in the proper phase) in parallel to the input of monostable multivibrator 23.2 as indicated in dashed lines in FIG. 9. Thus, the self-timing of the multivibrator is synchronized with the rhythm of the modulation signal $U_{mod}$ so that the ignition of the second thyristor in the alternator 23.1 is likewise correspondingly delayed.

The foregoing explanation of the operation of the sine wave power generator 22. However, care must be taken to assure that the modulating signal $U_{mod}$ is connected for determining the inherent reset time of the monostable multivibrator with reversed phase because the generator 22 is controlled in opposition to the operation of generator 23.

Instead of employing in the circuit of FIG. 2 summing transformer 24, it should be understood that other suitable devices may be employed. For example, semiconductors or other suitable devices may be employed. Likewise, the sine wave power generators may be directly connected to rectifier circuit 25. However, a transformer connection in the circuit permits optimal utilization of the thyristors in the sine wave power generators. Since thyristors are better able to carry very large currents, and to withstand very high voltages such as of the order of 30 kV, the transformer connection provides the required voltage adjustment while the thyristor achieves optimal current operations. The two sine wave power generators may also be directly connected in series. The control circuitry may be correspondingly modified easily. The principles of the present invention as described hereinabove are fully applicable to such modified circuitry.

Although there has been described a preferred embodiment of this novel invention, many variations and modifications will now be apparent to those skilled in the art. Therefore this invention is to be limited, not by the specific disclosure herein, but only by the appending claims.

The embodiments of the invention in which an exclusive privilege or property is claimed are defined as follows:

1. Apparatus for amplifying electrical input signal having a predetermined upper frequency limit comprising:

first and second phase modulated carrier frequency sources (22,23) having the same average frequency value which is greater than the upper frequency limit of the input signal;

phase control means (21) coupled to said carrier frequency sources for generating control signals to cause said sources to generate sine wave signals having opposing phase displacements which are related to the instantaneous value of the input signal to be amplified;

means (24) for summing the outputs of said carrier frequency sources to deliver an output of said average frequency and being amplitude-modulated with the input signal;

means (25) for demodulating the output of said summing means;

filter means coupled to said demodulation means for passing signals whose frequencies lie within the frequency range of said input signal.

2. The apparatus of claim 1 wherein the average frequency value of said carrier frequency sources is at least twice as great as the upper frequency limit of said input signal.

3. The apparatus of claim 1 wherein said carrier frequency sources sine wave power generators employing thyristor alternators.

4. The apparatus of claim 1 wherein said summing means comprises a tranformer having a primary winding coupled in series with the outputs of said carrier frequency sources and a secondary winding coupled to said demodulating means.

5. The apparatus of claim 1 within said phase control means comprising:

scanning wave generator means having as its output wave repetition frequency said average frequency of said carrier frequency sources;

timing pulse generator means having a first input compled to receive said scanning waves and a second input coupled to receive a signal to be scanned which is correlated to said input signal to be amplified for generating timing pulses in the moments the scanning wave passes the signal to be scanned;

means for coupling said timing pulses to said first and second carrier frequency sources to control their operating phase relations.

6. The apparatus of claim 5 within said scanning wave generator means comprising:

a timing sine wave generator (21.1);

rectifier means (21.2) compled to said timing sine wave generator for fullwave rectification of the output thereof and for delivering said scanning waves.

7. The apparatus of claim 5 within said timing pulse generator means comprising:

variable width square pulse generator means (21.3) having a first input connected to the output of said scanning wave generator means and a second input coupled to receive said signal to be scanned;

differentiating means (21.4) connected to the output of said square pulse generator means (21.3) for generating timing pulses shaped as needle pulses coinciding with the leading and trailing edges of said square pulses.

8. The apparatus of claim 5 wherein a sum signal ($U_{mod} + U_=$) composed of the input signal ($U_{mod}$) to be amplified and of a D.C. signal ($U_=$) is supplied as the said signal to be scanned to the second input of said timing pulse generator means.

9. The apparatus of claim 5 within said scanning wave generator means comprising:

means for generating spike pulses occuring at the maximum point of each scanning wave;

means for superimposing said spike pulses on the maximum values of said scanning waves in synchronism therewith.

10. The apparatus of claim 1 wherein at least one signal occurring between the output of said summing means (24) and the output of the apparatus comprises a D.C. component, the apparatus further comprising low-pass filter means (27) for deriving said D.C. component and for supplying this D.C. component via a feed-back loop (GK) to said phase control means (21), this phase control means comprising an additional control device connected to said feed-back loop and maintaining a desired value of said D.C. component.

11. The apparatus of claim 10 wherein at the output of the apparatus occurs a D.C. signal component, the apparatus further comprising:

means for providing a reference voltage ($k\cdot U_{0Soll}$) proportional to the desired value of said D.C. component;

low-pass filter means (27) coupled to the output of said filter means (26) for generating a D.C. signal ($k\cdot U_0$) proportional to the instantaneous value of said D.C. component;

comparator means (21.7) connected to said low-pass filter means and said reference voltage means for generating a control signal which is combined with the input signal for phase controlling said carrier frequency sources.

12. The apparatus of claim 11 further comprising:

a trigger circuit (213) provided as variable width square pulse generating means, said trigger circuit having two inputs, the first of which is a switching input connected to the output of said rectifier means (21.2) and the second of which is a threshold input the voltage of which determines the switching value of the signal at the first input;

multiplier means (21.5) having two inputs coordinated with the values to be multiplied, the first of these inputs being supplied with the input signal ($U_{mod}$) and the second input being supplied with a D.C. voltage ($1/U_=\cdot M$) being in reciprocal proportion to a predetermined value of the modulation degree (M) of said amplitude-modulated output of said summing means (24), the output of said multiplier means (21.5) being combined with the control signal ($U_=$) from the output of said comparator means (21.7), and said multiplier output being coupled to said second input of said trigger circuit (21.3).

13. The apparatus of claim 12 further comprising:

a first signal transformation circuit (21.6) coupled to the output of said comparator means (21.7) and comprising adjustment means determining the transformation of the comparator output ($U_=$) by a predetermined ratio (M);

a second signal tranformation circuit (21.8) coupled with its input to the output of said first signal transfornation circuit and with its output to the second input of said multiplier means (21.5) and having a reciprocal relation between its input and output signals.

14. The apparatus of claim 13 wherein said adjustment means of said first signal transformation circuit (21.6) is an adjustable voltage divider.

15. The apparatus of claim 13 wherein said predetermined ratio is the modulation degree (m) of the amplitude-modulated output signal of said summing means (24).

16. The apparatus of claim 13 further comprising:

a low-pass filter means incorporated in said first signal transformation circuit (21.6) passing only said D.C. component and slow variations thereof.

* * * * *